United States Patent [19]

Schwob

[11] Patent Number: 4,584,517
[45] Date of Patent: Apr. 22, 1986

[54] SELF-OSCILLATING DC-DC SWITCHING VOLTAGE REGULATOR

[75] Inventor: Walter Schwob, Commugny, Switzerland

[73] Assignee: Motorola, Inc., Schaumburg, Ill.

[21] Appl. No.: 620,240

[22] Filed: Jun. 13, 1984

[30] Foreign Application Priority Data

Jun. 16, 1983 [GB] United Kingdom ............ 8316352

[51] Int. Cl.$^4$ ........................................ H02M 3/142
[52] U.S. Cl. .................................... 323/222; 323/224
[58] Field of Search ................. 323/222, 224, 279; 363/19

[56] References Cited

U.S. PATENT DOCUMENTS 3,974,439  8/1976  Holland ........................... 323/222
4,355,277  10/1982  Davis et al. ..................... 323/222
4,514,679  4/1985  Schierjott ....................... 323/222

FOREIGN PATENT DOCUMENTS 2352828  4/1975  Fed. Rep. of Germany ...... 323/222

*Primary Examiner*—William H. Beha, Jr.
*Attorney, Agent, or Firm*—Vincent B. Ingrassia

[57] ABSTRACT

A DC-DC converter includes an inductor having a first terminal connected to a source of DC voltage to be converted. A power transistor is connected to the other terminal of the inductor and controls the passage of current therethrough. A rectifier has an input connected to the inductor and has an output which comprises the output of the converter. A capacitor has a first electrode connected to the output of the rectifier and a second electrode connected to the emitter of the power transistor, the collector of the power transistor being connected to the inductor. A comparator is connected to the power transistor for controlling the operation thereof in accordance with the capacitor voltage so as to produce a desired converter output voltage. The comparator has a first input connected to receive a first reference potential and a second input coupled to the second electrode of the capacitor. The output of the comparator is coupled to the base of the power transistor. A voltage sensing device is coupled between a second reference voltage and (a) the second electrode of the capacitor, (b) the emitter of the power transistor, and (c) the second input of the comparator.

6 Claims, 3 Drawing Figures

SELF-OSCILLATING DC-DC SWITCHING VOLTAGE REGULATOR

This invention relates to DC-DC converters. Such converters are used, for example, in systems which require a high DC voltage than is provided by a main power supply and/or in systems with a decentralised power supply. Typical applications are in microprocessor systems having EEPROM capability, in systems employing high-voltage liquid crystal or plasma displays and in automotive or industrial systems using battery power supplies and requiring high voltages.

A known voltage-up DC-DC converter is shown in FIG. 1. In this known DC-DC converter a fixed-frequency pulse-width-modulator 2 controls a power transistor 4, whose emitter is connected to ground through a resistor 6, and whose collector is connected to a battery supply voltage $V_{BAT}$ through an inductor 8. A rectifying diode 10 has its anode connected to the collector of transistor 4 and has its cathode connected to the output 12 of the converter. A storage capacitor 14 is connected between output 12 and ground and a differential amplifier 16 has one input connected via a resistance divider 18, 20 to output 12 and another input connected to a source of reference potential $V_{REF}$. The output of differential amplifier 16 is connected to control the pulse width of modulator 2.

In use of the known DC-DC converter shown in FIG. 1, the high inductance current generated at the collector of transistor 4 is peak-limited by the resistor 6 and is rectified by the diode 10 and smoothed by the capacitor 14 to produce a smooth, DC output voltage. The amplifier 16 is connected in a feedback path to provide stable, closed-loop control.

However, this known DC-DC converter suffers from the disadvantage that it requires a time-base oscillator (necessary to drive the fixed-frequency pulse-width-modulator) to operate.

Also, this known DC-DC converter requires an additional "soft-start" facility 22 to prevent output voltage overshoots and magnetic current imbalances at power up by forcing the duty cycle of the switching elements to gradually increase from zero at power-up.

This known DC-DC converter also requires an additional "dead-time setting" facility 24 to allow adjustment of the "dead-time" or maximum duty cycle so as to prevent cross-conduction of the switching transistor at high duty cycles due to storage time delays.

It is an object of the present invention to provide a DC-DC converter wherein the above disadvantages may be overcome or at least alleviated.

In accordance with the present invention a DC-DC converter comprises:

an inductance for connection at one terminal to a source of DC voltage to be converted;

switch means connected to another terminal of the inductance for controlling the passage of current through the inductance;

a rectifier having an input connected to the other terminal of the inductance and having an output connected to the output of the converter;

a capacitance connected to the output of the rectifier to smooth the voltage thereat; and control means connected to the switch means for controlling the operation thereof in dependence on the voltage at the capacitance to produce a desired converter output voltage, characterised in that the capacitance has a first electrode connected to the output of the rectifier and a second electrode connected to a side of the switch means remote from the inductance, and said control means comprises a first comparator having a first input connected to a first source of reference potential, a second input connected to the second electrode of the capacitance and an output connected to a control input of the switch means.

One DC-DC converter in accordance with the invention will now be described, by way of example only, with reference to the accompanying drawings, in which.

Figure 2:
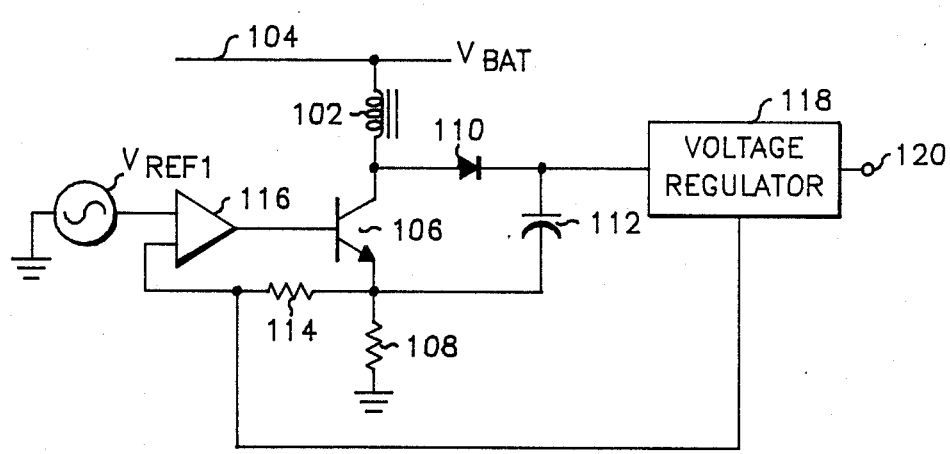
FIG. 2 shows a schematic block diagram of the circuit of the converter, to be described, in accordance with the invention.

Referring firstly to FIG. 2, an inductor 102 has one of its terminals connected to a line 104 to which is applied a DC supply voltage $V_{BAT}$ (e.g. from a car battery) to be converted. A transistor switch 106 has its collector connected to the other terminal of the inductor 102 and its emitter connected through a resistor 108 to ground. The collector of transistor 106 is also connected to the anode of a diode 110. The cathode of the diode 110 is connected to one electrode of a capacity 112; the other electrode of the capacitor 112 is connected to the emitter of the transistor 106. The emitter of the transistor 106 is also connected through a feedback resistor 114 to a first input of a voltage comparator with hysteresis 116, whose second input is connected to a source of reference potential $V_{REF1}$.

The output of the comparator 116 is connected to the base of the transistor 106. The cathode of the diode 110 is also connected to the input of a voltage regulator 118, the regulated output from the regulator 118 being connected to an output node 120 of the converter, and a feedback output (indicative of a difference between the unregulated input and the regulated output being greater than a predetermined value) being connected to the first input of the comparator 116.

In use of the converter of FIG. 2, when the comparator 116 produces its output, the transistor 106 turns on and current through the inductor 102 begins to rise. When the voltage at the emitter of the transistor 106 reaches the reference voltage $V_{REF1}$ (the upper threshold voltage) the comparator 116 ceases to produce its output and the transistor 106 turns off. At turn-off, the voltage at the collector of the transistor 106 rises abruptly and current flows through the diode 110 and charges the capacitor 112 until the voltage on the collector of the transistor 106 falls below the voltage on the capacitor 112. Meanwhile, as the capacitor 112 charges, the voltage at the emitter of the transitor 106 ramps down and when this voltage reaches the lower threshold voltage of the comparator 116 the comparator produces its output and turns on the transistor 106, beginning another conversion cycle.

The voltage produced at the cathode of the diode 110 is smoothed by the capacitor 112 and regulated by the voltage regulator 118. The voltage regulator also compares the regulated voltage at the output node 120 with the unregulated voltage at the cathode of the diode 110 and produces a feedback output indicative of the difference between these two voltages. This feedback output modifies the switching of the transistor 106 in dependence on the "error" voltage produced across the resistor 114, thus avoiding excessive poser dissipation and producing more efficient and more accurate conversion.

It will be appreciated that the above described DC-DC converter of FIG. 2 requires no external timebase (as in the known DC-DC converter of FIG. 1) in order to control the switching. The switching in the circuit of FIG. 2 is inherent in the circuit: it can be shown that the switching frequency is inversely proportional to the average power transferred. It will also be appreciated that in this way the DC-DC converter of FIG. 2 requires no additional facilities for controlling the "soft-starting" of the converter or for setting the "dead time" as in the known DC-DC converter of FIG. 1.

Figure 1:
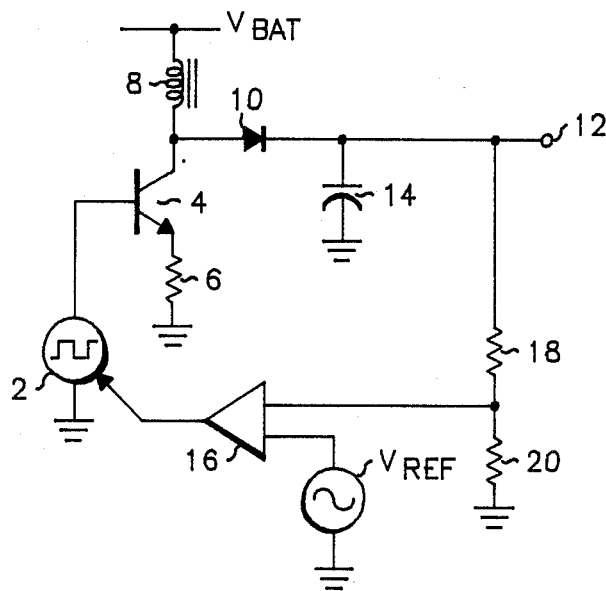
FIG. 1 shows a schematic block diagram of the known DC-DC converter previously described.

Other advantages of the converter of FIG. 2 over the converter of FIG. 1 are that (i) the supply voltage $V_{BAT}$ may be higher than the output voltage of the converter, i.e. the converter may operate as a voltage-down converter as well as a voltage-up converter, with smooth transitions between these modes of operations, (ii) the inductor does not saturate and so need not be of high quality, enabling an easily manufactured single winding to be used, and (iii) current through the transistor and the diode are well defined and are not dependent on external parameters such as changes in the system supply voltage, load or output voltage.

It will also be appreciated that instead of the voltage regulator 118, other forms of error feedback may alternatively be used, e.g. a comparator (not shown) may be used to compare the smoothed voltage at the cathode of the diode 110 with a fixed predetermined reference voltage, to provide an error feedback signal to the comparator 116.

Figure 3:
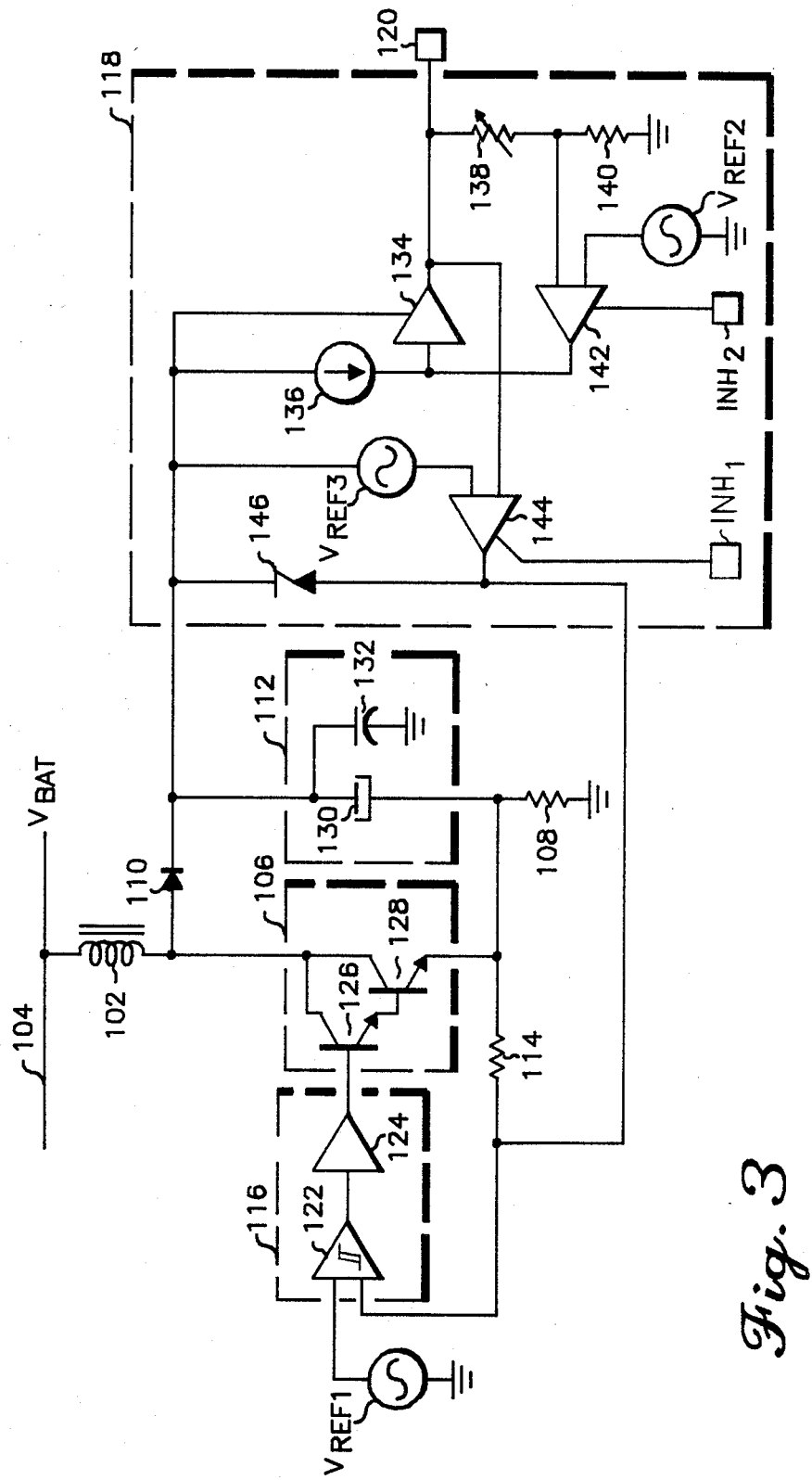
FIG. 3 shows a detailed circuit diagram of the circuit of FIG. 2.

Referring now also to FIG. 3, the voltage comparator 116 includes a comparator 122 and a buffer amplifier 124; the transisitor 106 comprises a Darlington transistor pair 126, 128; and the capacitor 112 is constituted by a capacitor 130 connected between the cathode of the diode 110 and the emitter of transistor 128 and a capacitor 132 (of comparatively small value) connected between the cathode of diode 110 and ground.

The voltage regulator 118 includes an operational amplifier 134 having its power supply input connected to the cathode of the diode 110 and having its signal input connected, via a constant current source 136, to the cathode of the diode 110. The output of the amplifier 134 is connected to the converter output node 120. The output of the amplifier 134 is also connected to one end of a variable resistance voltage divider 138, 140, the other end of which is connected to ground. An intermediate point on the voltage divider is connected to one input of a differential amplifier 142, the other input of which is connected to a source of reference potential $V_{REF2}$. The output of the differential amplifier 142 is connected to the signal input of the operational amplifier 134.

The output of the operational amplifier 134 is also connected to one input of a differential amplifier 144, whose other input is connected, via a source of reference potential $V_{REF3}$ to the cathode of the diode 110. The output from the differential amplifier 144 constitutes the feedback output from the voltage regulator 118 to the voltage comparator 116. Five series-connected Zener diodes (designated jointly as 146) are connected between the cathode of the diode 110 and the output of the amplifier 144.

In use, the amplifiers 134 and 142 form a series voltage regulator, the output of operational amplifier 134 being regulated by differential amplifier 142 in dependence on a comparison with $V_{REF2}$. The differential amplifier 144 detects whether the difference between the unregulated voltage at the cathode of the diode 110 and the regulated voltage at the output node 120 is greater than $V_{REF3}$ and if so produces a feedback signal in proportion to the difference.

The amplifiers 144, 142 are each provided with an inhibit input $INH_1$ and $INH_2$ respectively. Thus it is possible to disable the converter by applying an inhibit signal to amplifier 142. Alternatively, by applying an inhibit signal only to amplifier 144 the converter can be put into a "standby" mode: in this mode the feedback amplifier 144 is inactive and the voltage at the cathode of the diode 110 rises to a maximum value limited by the breakdown voltage of the Zener diode chain 146. However, the capacitors 130 and 132 remain fully charged, and so the converter is able to supply its normal output voltage at node 120 with only a short delay after the inhibit signal is removed from amplifier 144.

It will be appreciated that by changing the resistance of variable resistor 138 the converted, regulated voltage at the output node may be programmed as desired. It will be understood that the feedback loop of FIG. 3 is self-adjusting for changes in the programmed output voltage.

It will also be appreciated that, although not so shown in FIG. 2 or 3, the converter may also incorporate current limitation circuitry (to protect against short circuiting) and thermal protection circuitry (to shut down the converter in the event of excessive thermal conditions).

It will also be appreciated that the converter, possibly together with additional circuitry as desired, may be fabricated in an integrated circuit, the inductor and the capacitor conveniently being provided externally of the integrated circuit.

I claim:

1. A DC-DC converter comprising:
   an inductance for connection at one terminal to a source of DC voltage to be converted;
   switch means connected to another terminal of the inductance for controlling the passage of current through the inductance;
   a rectifier having an input connected to the other terminal of the inductance and having an output connected to the output of the converter;
   a capacitance connected to the output of the rectifier to smooth the voltage thereat;
   control means connected to the switch means for controlling the operation thereof in dependence on the voltage at the capacitance to produce a desired converter output voltage, and
   voltage sensing means coupled between the capacitor and the control means,
   characterized in that
   the capacitance has a first electrode connected to the output of the rectifier and a second electrode connected to a side of the switch means remote from the inductance,
   said control means comprises a first comparator having a first input connected to a first source of reference potential, a second input connected to the second electrode of the capacitance and an output connected to a control input of the switch means, and said voltage sensing means has a first terminal coupled to the second electrode of the capacitor and to the second input of the comparator and has a second terminal coupled to a second source of reference potential.

2. A DC-DC converter according to claim 1 and further comprising error feedback means having an input connected to the first electrode of the capacitance, and an output connected to the second input of the first comparator, the feedback means producing at its output a feedback signal in dependence on an error in the voltage at the first electrode of the capacitance exceeding a predetermined level.

3. A DC-DC converter according to claim 2 wherein the error feedback means comprises a voltage regulator including: amplifier means having an input connected to the input of the error feedback means and an output connected to the output of the converter; a second comparator having a first input connected to the output of the amplifier means, a second input connected to a second source of reference potential and an output connected to the input of the amplifier means; and a third comparator having a first input connected to the output of the amplifier means, a second input connected to the input of the amplifier means in series with a third source of reference potential and an output which is connected to the second input of the first comparator.

4. A DC-DC converter according to claim 3 wherein means are provided for inhibiting the third comparator and voltage limiting means are connected between the first electrode of the capacitance and the output of the third comparator.

5. A DC-DC converter according to claim 3 or 4 wherein a variable voltage divider is connected between the output of the amplifier means and the first input of the second comparator.

6. A DC-DC converter according to claim 5 wherein means are provided for inhibiting the second comparator so as to disable the voltage regulator.

* * * * *